(12) United States Patent
Koop et al.

(10) Patent No.: US 10,948,325 B2
(45) Date of Patent: Mar. 16, 2021

(54) METERING DEVICE AND ASSOCIATED UNLOADING METHODS FOR HOPPER-BOTTOMED STORAGE BINS

(71) Applicant: C.T. Riddell Farm (2000) Ltd, Warren (CA)

(72) Inventors: Frank Koop, Warren (CA); Craig Riddell, Warren (CA)

(73) Assignee: C.T. Riddell Farm (2000) Ltd, Warren (CA)

( * ) Notice: Subject to any disclaimer, the term of this patent is extended or adjusted under 35 U.S.C. 154(b) by 0 days.

(21) Appl. No.: 16/596,964

(22) Filed: Oct. 9, 2019

(65) Prior Publication Data

US 2020/0109981 A1 Apr. 9, 2020

Related U.S. Application Data

(60) Provisional application No. 62/743,212, filed on Oct. 9, 2018.

(30) Foreign Application Priority Data

Oct. 9, 2018 (CA) ...................................... 3020110

(51) Int. Cl.
*G01F 11/00* (2006.01)
*G01F 11/10* (2006.01)
*E04H 7/22* (2006.01)

(52) U.S. Cl.
CPC ............. *G01F 11/003* (2013.01); *E04H 7/22* (2013.01); *G01F 11/10* (2013.01)

(58) Field of Classification Search
CPC ........... G01F 11/003; G01F 11/10; E04H 7/22
See application file for complete search history.

(56) References Cited

U.S. PATENT DOCUMENTS

| 3,070,210 A | * | 12/1962 | Woodward, Jr. ... | B65G 47/1471 198/397.01 |
| 4,254,898 A | * | 3/1981 | Davis ................... | G01F 11/003 222/263 |
| 4,395,128 A | * | 7/1983 | Mathis ..................... | E04H 7/22 220/4.27 |

(Continued)

FOREIGN PATENT DOCUMENTS

RU 134634 U1 * 11/2013

*Primary Examiner* — Saul Rodriguez
*Assistant Examiner* — Ashley K Romano
(74) *Attorney, Agent, or Firm* — Kyle R Satterthwaite; Michael R Williams; Ade & Company Inc.

(57) ABSTRACT

A metering device for metered dispensing of granular material from a hopper bottom storage bin. The device features a metering housing having a housing inlet for receiving said granular material from a hopper outlet of the storage bin, and a housing outlet from which the granular material is dispensable from the housing. A metering mechanism driven by an onboard motor is operable within the housing to dispense the granular material through the housing outlet in a metered fashion. A mounting arrangement is attachable to the storage bin in a position suspending the metering housing below the hopper outlet. The housing is movable into and out of a working position aligned under the hopper outlet, and can also be adjusted in tilt angle to achieve a properly leveled alignment in the working position.

22 Claims, 14 Drawing Sheets

(56) References Cited

U.S. PATENT DOCUMENTS

| | | | | |
|---|---|---|---|---|
| 4,528,848 | A * | 7/1985 | Hafner | G01F 11/24 |
| | | | | 110/101 CC |
| 4,964,535 | A * | 10/1990 | Curwen | A01K 5/0275 |
| | | | | 119/56.1 |
| 5,040,668 | A * | 8/1991 | Hoppmann | B65G 15/00 |
| | | | | 198/779 |
| 5,148,943 | A * | 9/1992 | Moller | B01F 15/0251 |
| | | | | 222/1 |
| 6,059,144 | A * | 5/2000 | Vollmar | G01F 11/003 |
| | | | | 222/77 |
| 6,868,801 | B2 * | 3/2005 | Rovira Badia | A01K 5/0225 |
| | | | | 119/51.5 |
| 2002/0000448 | A1 * | 1/2002 | Romeo | G01F 13/005 |
| | | | | 222/1 |
| 2016/0234998 | A1 * | 8/2016 | Gebbeken | A01C 7/102 |
| 2020/0038888 | A1 * | 2/2020 | Van Den Heuvel | B05B 1/20 |

* cited by examiner

METERING DEVICE AND ASSOCIATED UNLOADING METHODS FOR HOPPER-BOTTOMED STORAGE BINS

CROSS-REFERENCE TO RELATED APPLICATIONS

This application claims benefit under 35 U.S.C. 119(e) of U.S. Provisional Application No. 62/743,212, filed Oct. 9, 2018, the entirety of which is incorporated herein by reference.

FIELD OF THE INVENTION

The present invention relates generally to equipment and methods for unloading hopper-bottomed storage bins.

BACKGROUND

Hopper-bottomed storage bins are commonly employed in the agriculture industry for the purpose of storing seed or grain. Unloading of such granular material from the bin conventionally involves free gravitational dumping of the granular material through a bottom hopper outlet of the bin into an inlet hopper of a portable transfer conveyor, which may be a cleated belt conveyor or a screw auger conveyor. Before unloading of the storage bin is initiated, the transfer conveyor is wheeled into a position aligning its inlet hopper under the hopper outlet, at which point a slide gate on the bin's hopper outlet is opened to start dumping the granular material from the storage bin into the inlet hopper of the running transfer conveyor. From the inlet hopper residing at ground level under the hopper outlet, the transfer conveyor features an inclined housing through which the conveyor belt or screw auger slopes upwardly to an upper end of the inclined housing, where a downwardly opening discharge of the transfer conveyor dumps the granular material into a targeted destination of the granular material. Without limiting the present invention to use with any particular pieces of equipment, this targeted destination may be a transport truck or trailer, a seed tote, a seed treater, a grain cleaner, or a grain dryer.

This conventional unloading procedure is subject to inefficiencies, included underused equipment capacity and wasteful material losses, as the volume of granular material flowing between the storage bin and the targeted destination is not controlled with any notable degree of precision. The human operator of the transfer conveyor may terminate the operation thereof before the targeted destination is filled to its maximum capacity, or may allow the transfer conveyor to run to long, resulting spillage when the destination is overfilled beyond its designed capacity. Even if the termination of the conveyor is accurately timed to prevent underfill or overfill at the targeted designation, a residual volume of granular material remains within the transfer conveyor, representing a wasted fraction of the stored bin contents.

Accordingly, there is a need for equipment and methodologies for more efficient unloading of the hopper-bottomed storage bins.

SUMMARY OF THE INVENTION

According to a first aspect of the invention, there is provided metering device for metered dispensing of granular material from a hopper bottom storage bin, said metering device comprising:
a metering housing;
a housing inlet opening downwardly into the housing for receiving said granular material from a hopper outlet of the hopper bottom storage bin;
a housing outlet from which the granular material is dispensable from the housing; and
a metering mechanism operable within the housing between the housing inlet and the housing outlet to receive the granular material from the housing inlet and dispense said granular material through the housing outlet in a metered fashion;
a motor mounted to the meter housing and operably coupled to the metering mechanism for selective driven operation thereof; and
a mounting arrangement from which the metering housing is suspended, said mounting arrangement being configured for attachment to the hopper bottom storage bin in a position suspending the metering housing below the hopper outlet.

According to a second aspect of the invention, there is provided a method of unloading granular material from a hopper-bottomed storage bin, said method comprising, with a metering housing of said device suspended from said hopper-bottomed storage bin in a working position under a hopper outlet thereof, positioning an inlet hopper of a portable conveyor under an outlet of the metering device, and operating said metering device to perform controlled dispensing of granular material from said hopper-bottomed storage bin into said portable conveyor for transport of a metered quantity of said granular material through said conveyor to a targeted destination.

According to a third aspect of the invention, there is provided a method of supporting a metering device in working relation to a hopper outlet of a hopper-bottomed storage bin, said method comprising suspending a metering housing of said metering device from spokes of said hopper-bottomed storage bin that emanate outwardly from said hopper outlet to connect with outer support legs of said hopper-bottomed support bin.

According to a fourth aspect of the invention, there is provided a metering device comprising:
a housing having a housing inlet for receiving granular material and a housing outlet for dispensing said granular material;
a metering mechanism comprising a set of rollers rotatably supported in the housing, an endless belt entrained about said set of rollers to follow a revolutionary path therearound, and a set of cleats attached to said belt at regularly spaced intervals, the rollers and the belt being oriented to convey the cleats in underpassing relation to the housing inlet of the metering housing, and onward toward the housing outlet of the metering housing, during an upper span of said revolutionary path; and
an internal liner disposed on an interior side of an upper wall of the metering housing at an area thereof residing between the housing inlet and the housing outlet, said internal liner being of distinct material composition from the upper wall of the metering housing and being positioned for sliding contact thereof by the cleats as said cleats move past the housing inlet toward the housing outlet during said during an upper span of said revolutionary path.

BRIEF DESCRIPTION OF THE DRAWINGS

One embodiment of the invention will now be described in conjunction with the accompanying drawings in which.

DETAILED DESCRIPTION

Figure 1:
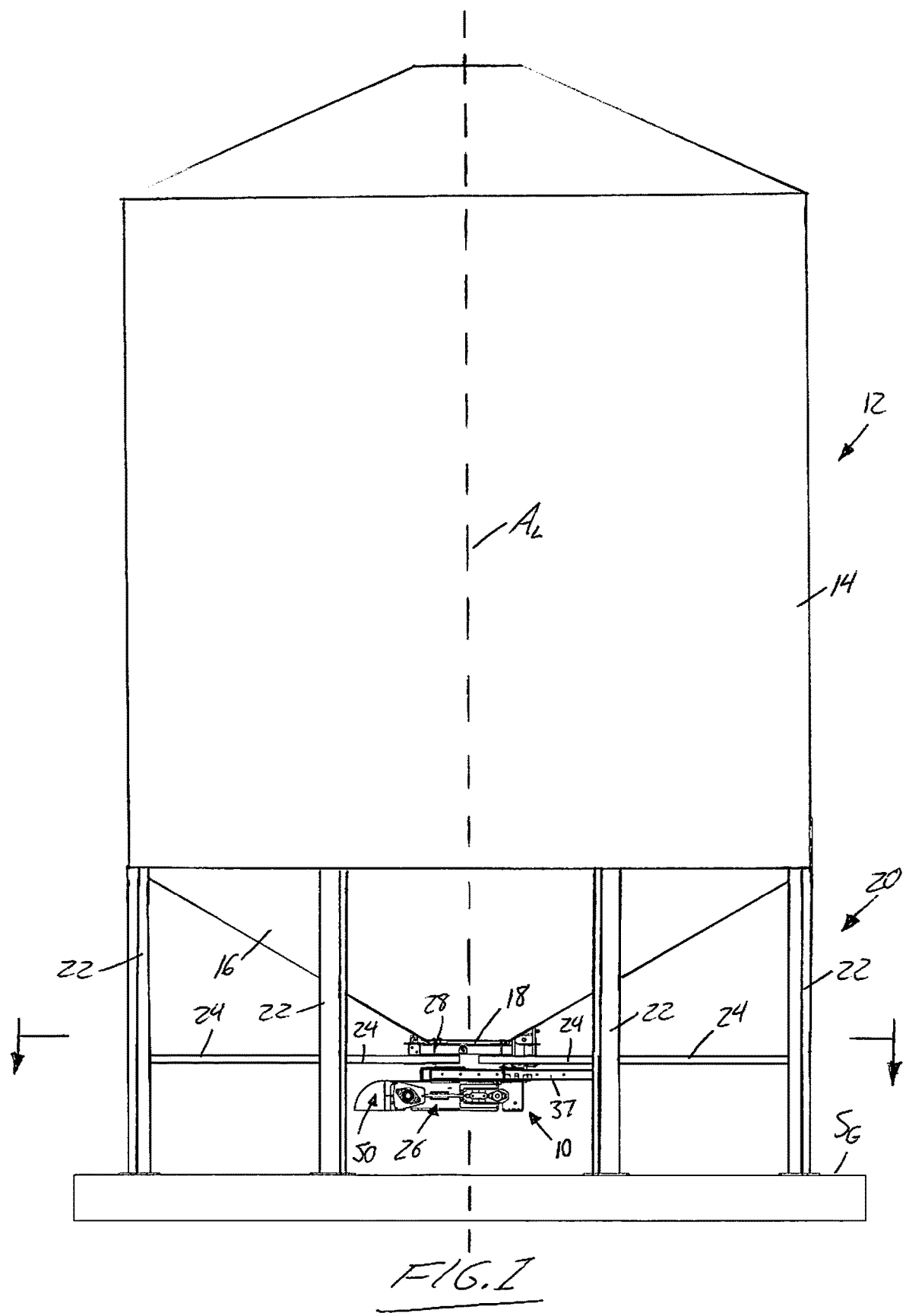
FIG. 1 is an elevational view of a hopper-bottomed storage bin on which a metering device of the present invention has been installed to provide controlled discharge of granular material from the hopper-bottomed storage bin.

FIG. 1 illustrates a metering device 10 of the present invention in an installed position mounted to the spoked base of an existing hopper-bottomed granular storage bin 12 in which seed, grain or other granular material is stored. The storage bin features a cylindrical outer bin wall 14 closing around a central longitudinal axis $A_L$ of the bin, and a frustonical hopper bottom 16 whose wider upper end is affixed to the bottom end of the outer bin wall 14 and whose narrower bottom end terminates at a bottom hopper outlet 18 of the bin. The outer bin wall 14 and attached hopper bottom 16 delimit an interior storage space of the bin above the bottom hopper outlet 18 thereof.

The hopper bottom 16 shares the same vertically-oriented central longitudinal axis $A_L$ as the outer bin wall, and the hopper outlet 18 is likewise centered on this same axis. A support base 20 of the bin 12 features a plurality of upright support legs 22 standing vertically upward from a concrete pad or other horizontal ground surface $S_G$ in a circumferential array spaced around the hopper outlet 18 in underlying relation to the outer perimeter of the bin. The upper ends of the support legs 22 attach to the bin at this outer perimeter thereof where the outer bin wall 14 and hopper bottom 16 are jointed together. The support legs therefore carry the bin in an elevated state spacing the hopper outlet 18 above the ground surface $S_G$. The support base 20 also features a plurality of spokes 24 each emanating radially outward from the hopper outlet 18 to a respective one of the support legs 22 in a common horizontal plane shared by said spokes 24 and the hopper outlet.

The metering device 10 features a metering housing 26 supported in a horizontal plane closely underlying that shared by the hopper outlet 18 and base spokes 24. This metering housing 26 is designed to receive granular material from the interior space of the storage bin through the bottom hopper outlet 18, and contains a metering mechanism (described in more detail below) for the purpose of enabling precise volumetric control over the dispensing of this granular material from the bin 12. The metering housing 26 is suspended in a hanging state from a mounting arrangement that is seated atop the base spokes 24 and is secured thereto, whereby the entirety of the metering device is supported solely by the bin in an installed position suspended therefrom in elevated relation above the ground surface $S_G$.

Figure 2:
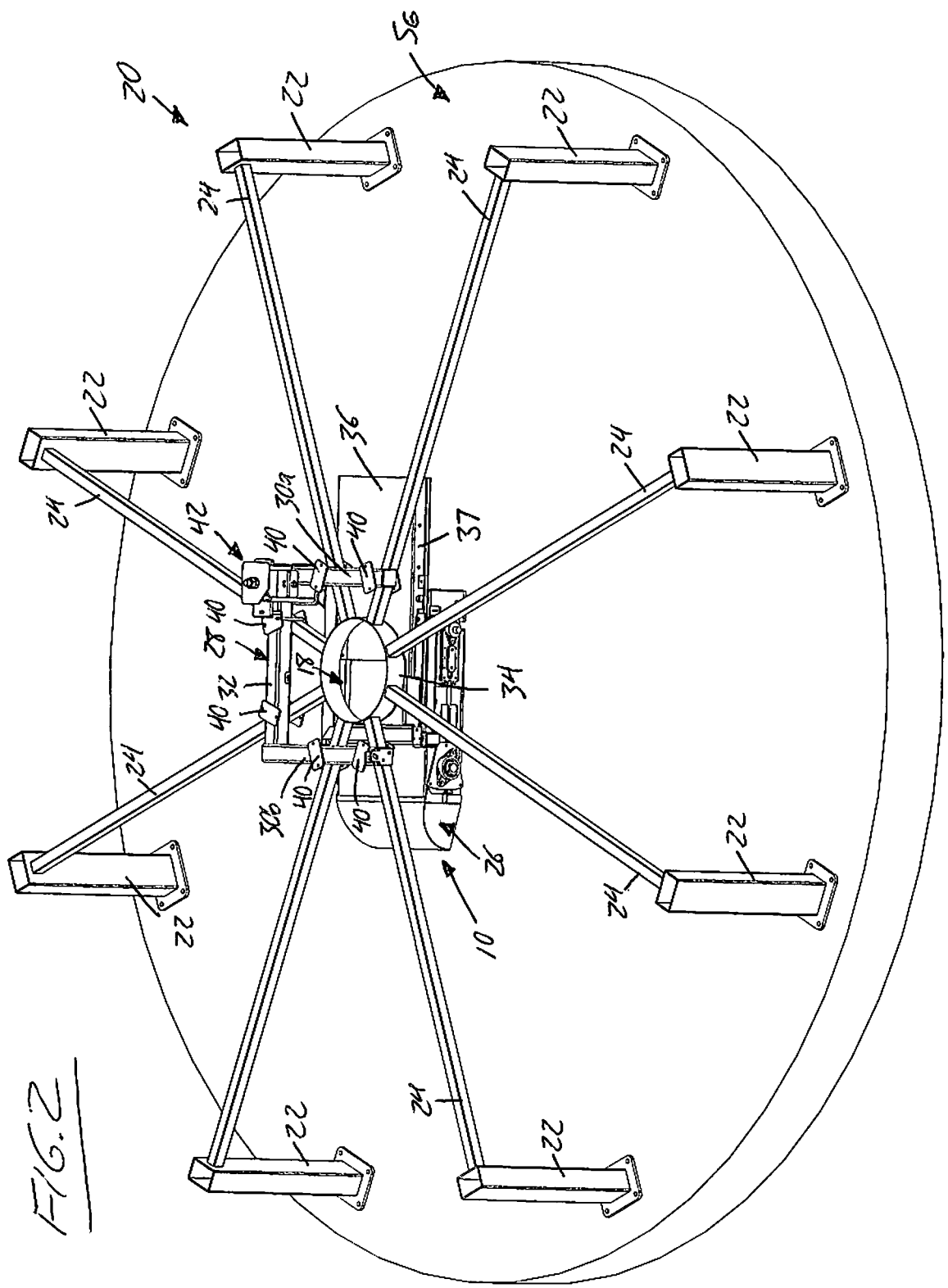
FIG. 2 is a perspective view showing the metering device with the hopper-bottomed storage bin of FIG. 1 cut away along line A-A thereof to illustrate mounting of the metering device on spokes of a base section of the hopper-bottomed storage bin.

With reference to FIG. 2, the mounting arrangement the metering device 10 is a U-shaped mounting frame 28 having two parallel outer legs 30a, 30b and a cross-leg 32 that perpendicularly joins said outer legs 30 together at matching ends thereof. In the installed position of the metering device on the storage bin 12, these three frame legs 30a, 30b, 32 are seated atop the coplanar base spokes 24 of the storage bin and reside on three respective sides of the hopper outlet 18. In the drawings, the hopper outlet 18 is delimited by a small-stature cylindrical collar 34 to which the inner ends of the spokes are attached, and which in turn is affixed to the narrower end of the bin's frustoconical hopper bottom 16. FIG. 2 also shows the inclusion of a slide gate 36 slidably carried in a track 37 affixed to the outlet collar 34. The track enables linear displacement of the slide gate 36 between a closed position spanning across the hopper outlet 18 to close off the interior space of the bin and prevent release of the stored granular material therefrom, and an open position withdrawn at least partially outward from under the hopper outlet 18 to allow release of said granular material from the bin's interior space. In the installed position of the metering device 10, the metering housing 26 is resides below the slide gate 36 and its associated track 37 so that the slide gate 36 is operable to selectively block and enable release of granular material from the storage bin 12 into the metering housing 26.

The U-shaped mounting frame 28 of the metering device 10 has an unoccupied open end 38 situated opposite the cross leg 32 thereof, whereby the mounting frame 28 spans around only three of the hopper outlet's four sides in the installed position of the metering device 10. This allows the mounting frame 28 to be slipped into this installed position by accommodating the receipt of the hopper outlet 18 through the open end 38 of the mounting frame as the mounting frame is horizontally displaced over the base spokes 24 of the bin into this installed position. At each spoke 24 spanned by one of the frame legs 30a, 30b, 32 of the mounting frame, the mounting frame 28 is secured to the spoke 24 by a respective clamp 40 that embraces over the topside of the frame leg and beneath the underside of the respective spoke 24. Such clamped securement of the mounting frame 28 to the base spokes 24 of the bin enables simple, removable attachment of the metering device 10 to an existing storage bin without any drilling or other modification to the existing bin structure. However, it will be appreciated that the mounting frame may additionally or alternatively be welded or bolted to the spokes if desired for a more permanent installation.

The metering housing 26 is pivotally coupled to the mounting frame 28 by an adjustable pivot joint 42 through which the metering housing 26 is both pivotable about an upright axis to swing between working and withdrawn positions relative to the hopper outlet 18, and adjustable in a tilt angle at which it resides relative the frame in order to allow proper levelling of the metering housing should it be installed on a bin whose base spokes 24 deviate from true horizontal.

Turning away from FIG. 2, attention is turned the larger scale views of the metering device in FIGS. 3 to 12 in order to provide more detail on the construction of the device itself.

The metering housing 26 features a horizontal upper wall 44, a pair of vertical side walls 46a, 46b depending downwardly from the upper wall 44 at opposing perimeter sides thereof, and a vertical rear wall 48 likewise depending downwardly from the upper wall 44 at a rear perimeter edge thereof and spanning perpendicularly between the two side walls to close off a rear end of the metering housing. At an opposing front end of the metering housing, a discharge hood 50 is affixed to the upper and side walls of the housing. The hood 50 features a curved wall 52 that slopes forwardly and downwardly from the upper housing wall 44 and has an externally convex and internally concave curvature. Opposing sides panels 54a, 54b of the hood 50 each close off a respective side thereof by spanning from a respective side wall 46a, 46b of the housing 26 to the terminal end of the curved hood wall 52 furthest from the housing side walls 46a, 46b. An internal space of the metering housing is delimited below the upper wall 44 thereof between the housing side walls 46a, 46b and hood side panels 54a, 54b, and between the rear housing wall 48 and curved hood wall 52. An inlet opening 56 if the housing penetrates a generally central area of the upper wall 44 to define the inlet from which granular material from the storage bin hopper outlet 18 gravitationally falls into the interior of the metering housing 26 when the slide gate 36 of the storage bin is opened. The front and rear ends of the metering housing are separated in a horizontally longitudinal reference direction, while the side walls of the housing are separated in a horizontally lateral reference direction that is perpendicular to the longitudinal reference direction.

The metering mechanism installed in the housing 26 features a first horizontal roller 58 whose roller shaft 58a penetrates the side walls 46a, 46b of the metering housing 26 near the front end thereof. The first roller shaft 58a is rotatably supported within the interior space of the metering housing 26 by a pair of bearings 60a, 60b mounted to said housing side walls 46a, 46b. A right-angle gearbox 62 is mounted to one of the housing side walls 46b, outside of which an output shaft of the gearbox is coupled to a respective end of the first roller shaft 58a. On this same outer side of the metering housing 26, a drive motor 64 is likewise externally mounted to housing side wall 46b in a position in which the motor driveshaft lies in the longitudinal reference direction parallel to the housing side wall 46b. The motor driveshaft is coupled in-line to an input shaft of the gearbox 62. The rotational axes $A_I$, $A_O$ of the gear box's input and output shafts, which are respectively shared by the motor driveshaft and first roller shaft 58a, lie perpendicular to one another in the longitudinal and lateral reference directions. The first roller 58 thus lies in the lateral reference direction, and the right-angle gearbox enables driven rotation of the first roller 58 about its laterally oriented axis $A_O$ under driven rotation of the motor driveshaft about its longitudinally oriented axis $A_I$.

The metering mechanism further comprises a second roller 66 lying parallel to the first roller in distally spaced relation thereto near the opposing rear end of the metering housing. The roller shaft 66a of the second roller 66 is not a motor driven shaft like that of the first roller, but is instead an idler shaft similarly supported by a pair of bearings 68a, 68b carried on the opposing sides walls 46a, 46b of the metering housing 26. These bearings 68a, 68b may be mounted on a pair of movable supports 70 each slidable back and forth in the longitudinal reference direction within a respective guide track 72 having upper and lower rails 72a, 72b affixed to the respective housing side wall 46a, 46b, whereby the second roller shaft 66a is selectively displaceable toward and away from the first roller shaft 58a to adjust a belt-tension of the metering mechanism.

Figure 10:
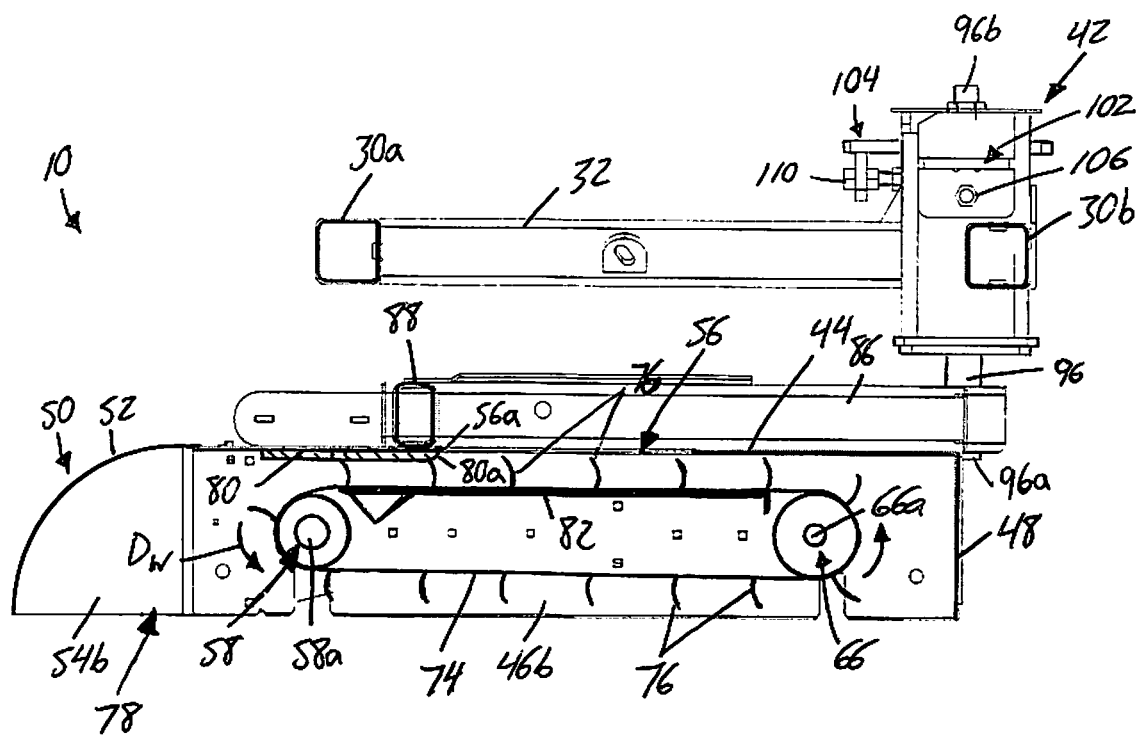
FIG. 10 is a cross-sectional view of the metering device of FIG. 9, as viewed along line B-B thereof.

With reference to FIG. 10, an endless belt 74 having an array of identical cleats 76 affixed thereto at regularly spaced intervals over the endless length thereof is entrained about the first and second rollers 58, 66 inside the metering housing 26. The first roller 58 is driven in a working direction $D_w$ by the drive motor 64 via the gearbox 62 such that the belt 74 makes a rearward lower pass toward the rear end wall 48 of the housing, and an upper pass toward the hood 50 at the front end of the housing. During this travel of the belt 74 around the rollers 58, 66, the cleats 76 thus pass underneath the inlet 56 of the housing 26 toward the hooded front end thereof during the upper span of this revolutionary path around the rollers. The open space between the first roller 58 and the terminal end of the curved hood wall 52 denotes an outlet opening 78 of the metering housing, toward which granular material entering the inlet 56 of the housing and falling onto the upper span of the moving belt 74 is conveyed by the cleats 76 during this driven revolution of the belt 74 around the rollers 58, 66 by the drive motor 64 and gear housing 62.

Affixed to the underside of the housing's upper wall 44 at the area thereof between the housing inlet 56 and housing outlet 78 is an internal liner 80 made of low friction polymeric material, such as ultra high molecular weight polyethylene (UHMW). The cleats 76 on the belt 74 have a sufficient height to make sliding contact with the underside of this internal liner 80 as they travel forwardly thereunder toward the outlet 78 of the metering housing 26. This way, no gap space is left between the top edge of each cleat and the liner 80, thus preventing granules of material from escaping the space between two adjacent cleats as they travel from the housing inlet 56 toward the housing outlet 78. Granular material falling from the hopper outlet 18 into the housing 26 fills the entire available space between any two adjacent cleats as they underpass the housing inlet 56. Granules piled above the top edges of these two adjacent cleats is sheared away as those two cleats come into wiping contact with the underside of the polymeric liner 80. Accordingly, each inter-cleat space travelling toward the housing outlet 78 contains a precise quantity of granular material fully occupying a predetermined volumetric capacity of this inter-cleat space between the two adjacent cleats.

To prevent damage to the cleats 76, and to achieve and maintain full and continuous contact with the liner 80 as the cleats come into contact therewith for optimal volumetric accuracy, the interior liner 80 is provided with a convexly contoured curvature at a contact edge 80a thereof that borders the housing inlet 56 at a front boundary thereof nearest the front end the housing. This represents an initial contact area at which the top edge of each cleat first contacts the liner, and the curvature of this contact area provides a smooth transition from the inlet-underpassing stage of the cleat's travel to the liner-wiping stage thereof, as opposed to more abrupt impact of the upper edge of the cleat against a hard square edge. With the exception of this curved area at contact edge 80a, the remainder of the liner 80 is a flat plate of purely planar form spanning the full width of the belt cleats in the lateral direction of the housing, and spanning a longitudinal distance at least as great as the longitudinal inter-cleat measure between any two adjacent cleats. As shown, the belt 74 may ride over a horizontal support plate 82 that underlies at least a full area of the housing inlet 56 as the belt travels through the upper span of its revolutionary path around the rollers 58, 66. The support plate helps prevent sagging of the belt at this upper span thereof onto which the granular material falls from the hopper outlet 18.

Figure 3:
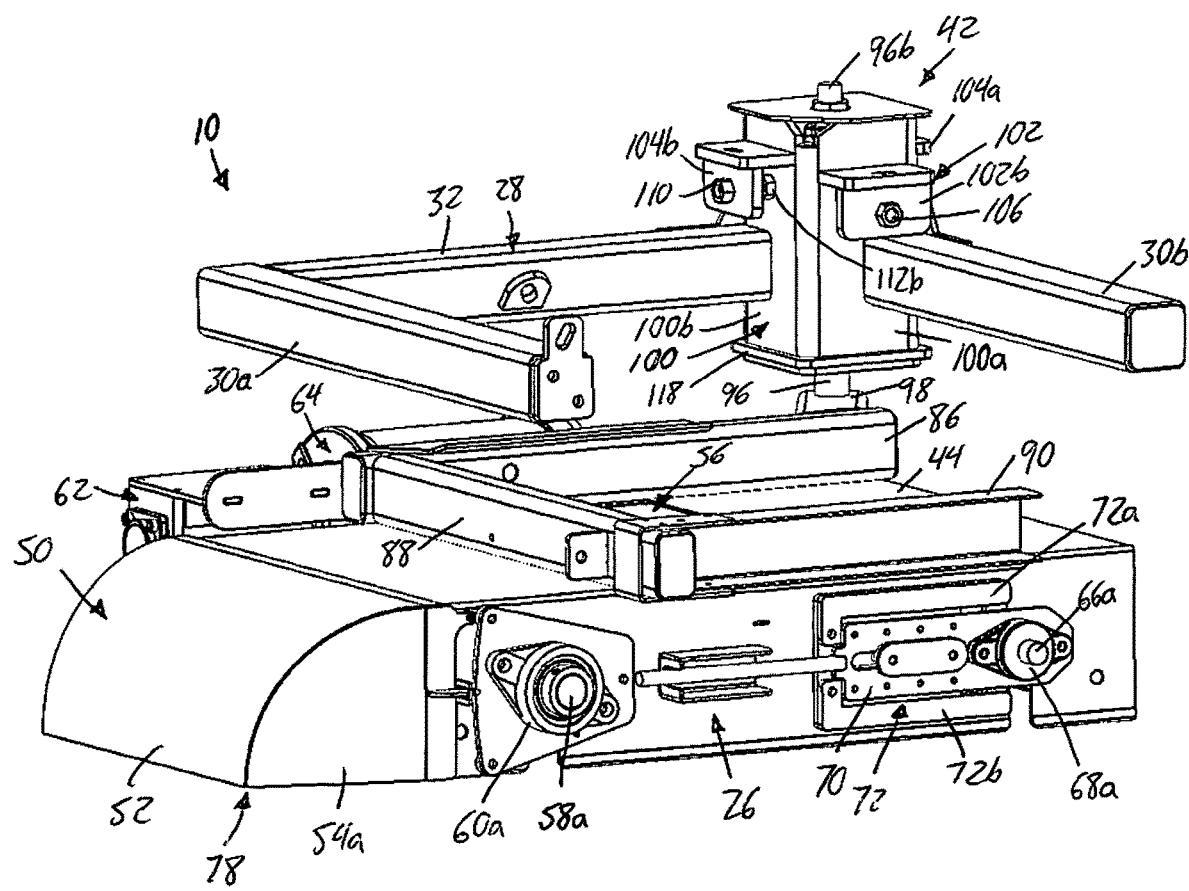
FIG. 3 is a front side perspective view of the metering device in isolation.
Figure 4:
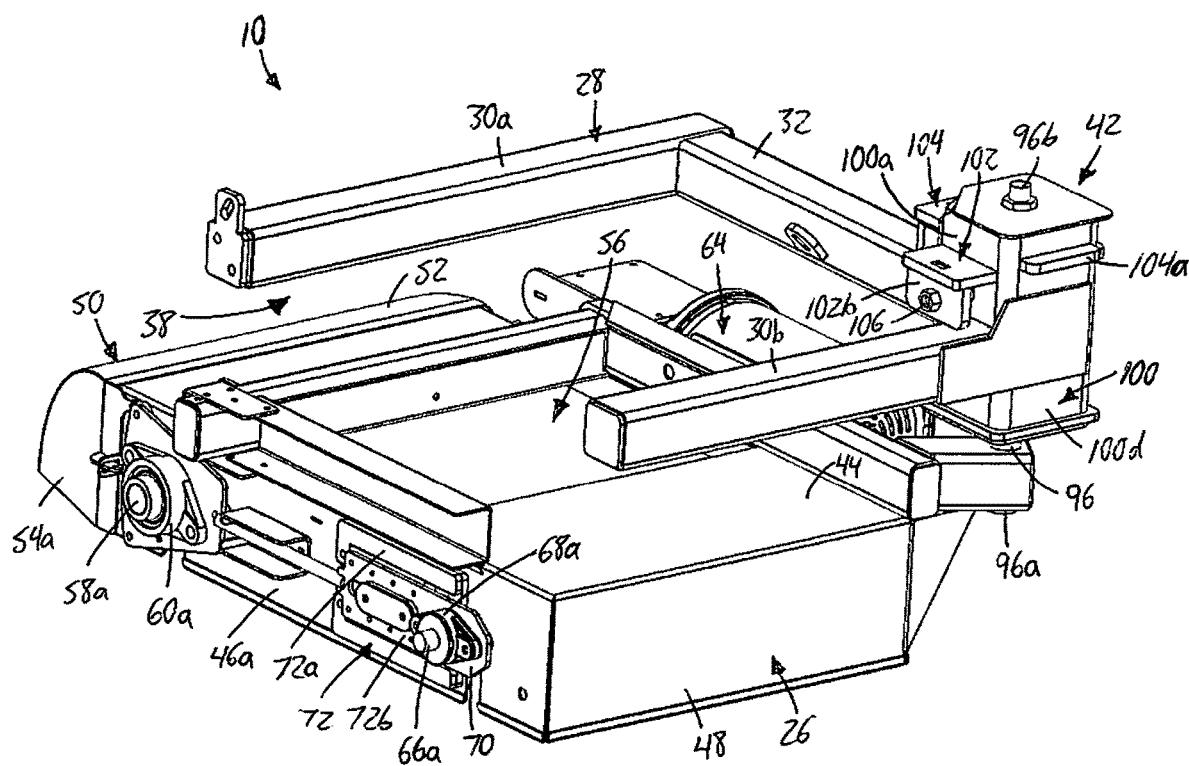
FIG. 4 is a rear side perspective view of the metering device.
Figure 5:
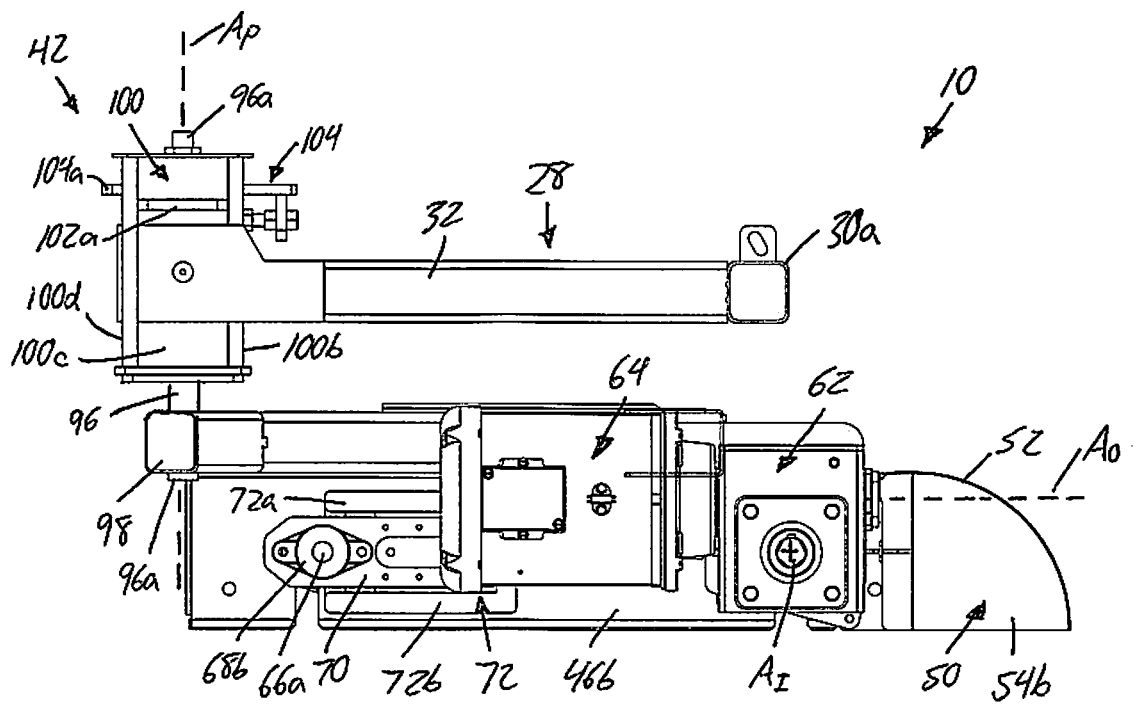
FIG. 5 is a side elevational view of the metering device.
Figure 6:
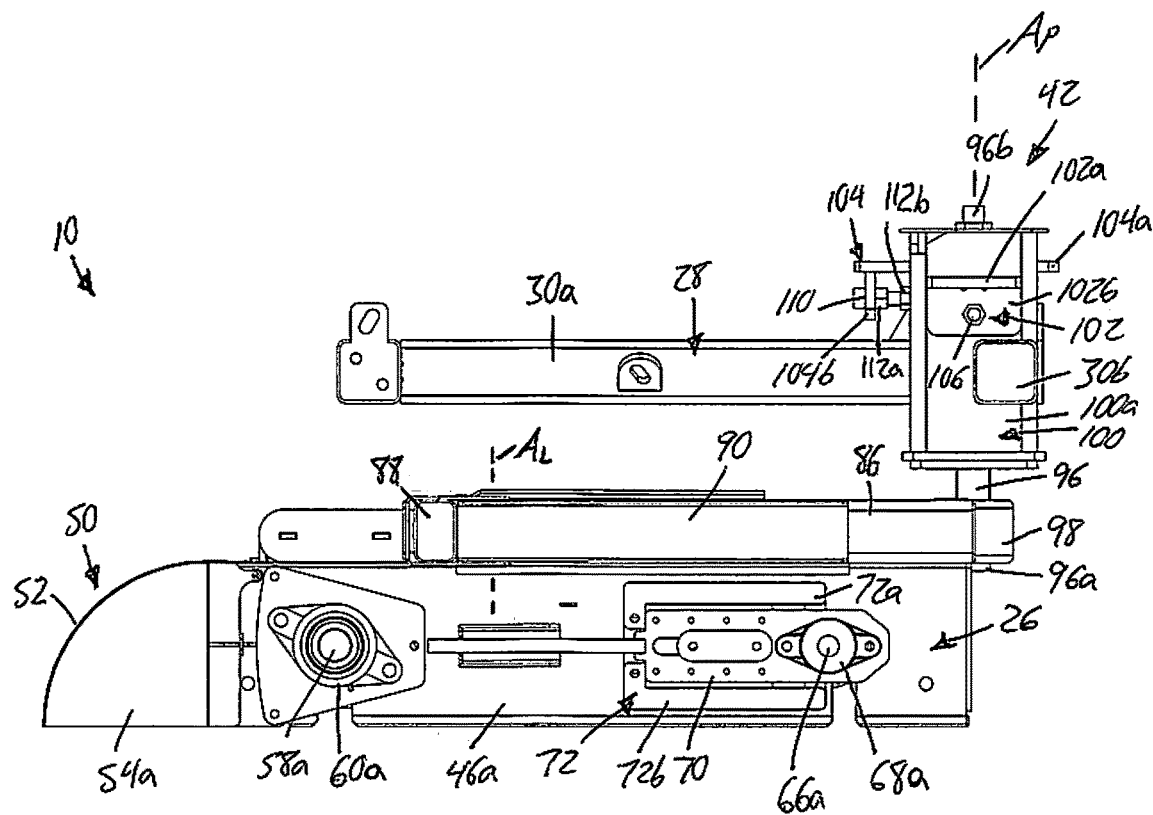
FIG. 6 is an opposing side elevational view of the metering device.
Figure 7:
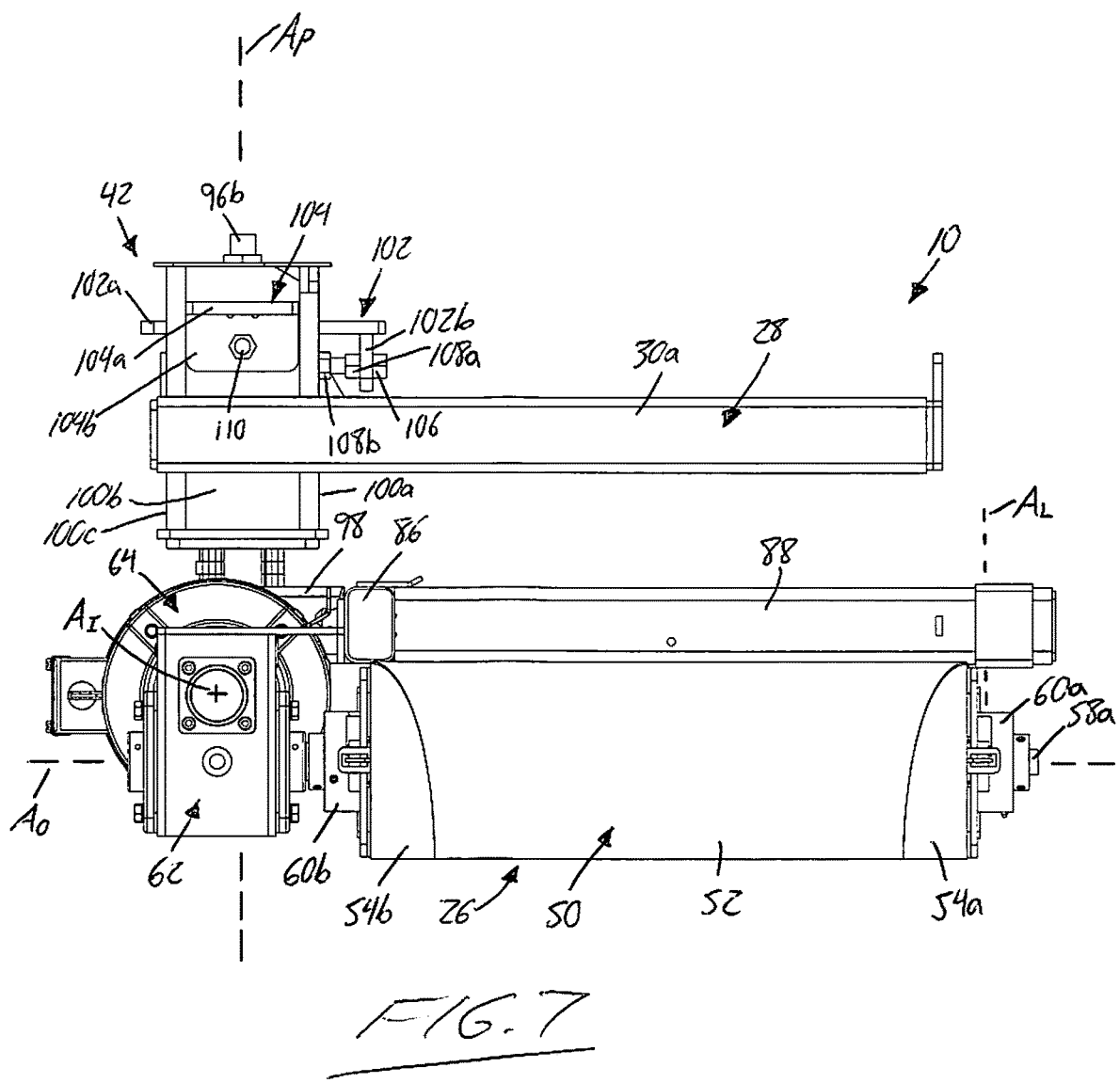
FIG. 7 is a rear end view of the metering device.
Figure 8:
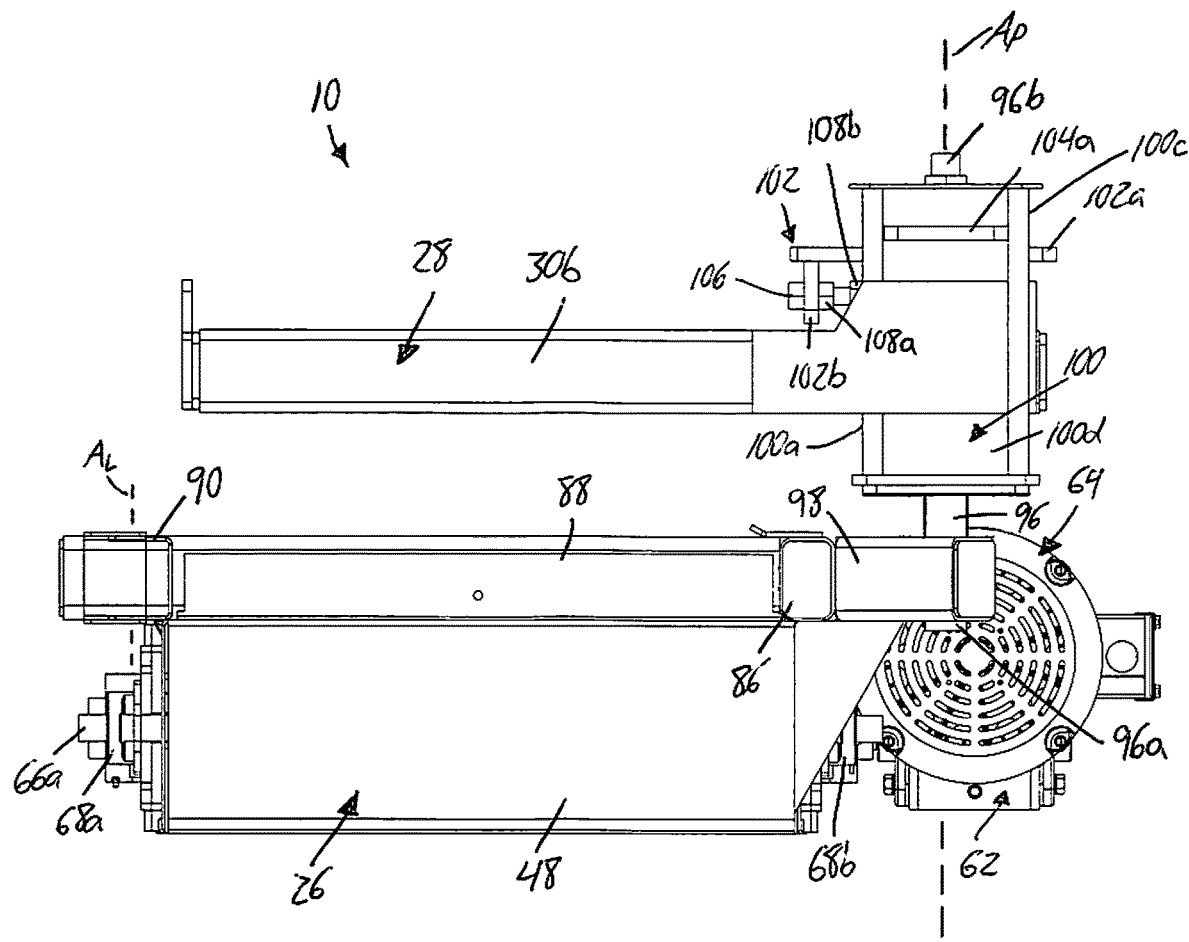
FIG. 8 is a front end view of the metering device.
Figure 13:
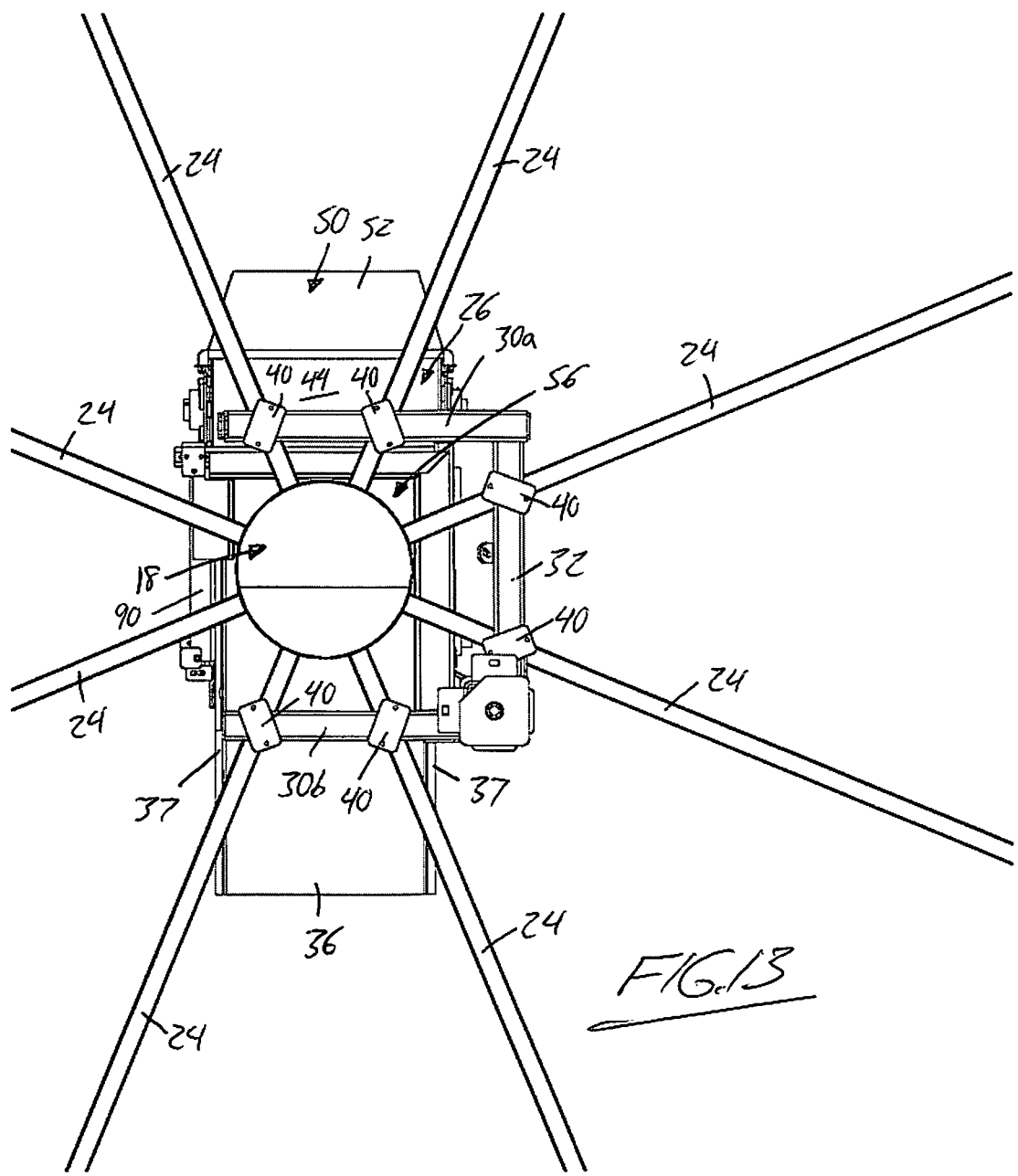
FIG. 13 is a plan view of the metering device of FIG. 2 with a metering housing thereof residing in a working position aligned under a bottom hopper outlet of the storage bin.

With reference to FIGS. 3 and 4, to establish and maintain alignment of the metering housing inlet 56 with the hopper outlet 18, the top of the metering housing 26 features an alignment and latching mechanism, which includes a right-angle alignment bracket 84 featuring first and second bracing members 86, 88 fixed atop the housing's upper wall 44. The first bracing member 86 lies in the longitudinal reference direction at a side of the inlet opening 56 nearest the respective housing side wall 46b. The second bracing member 88 lies perpendicularly of the first bracing member 86 in the lateral reference direction at a location at or near the front boundary 56a of the inlet opening. When the metering housing is in a working position aligning the housing inlet 56 with the hopper outlet 18 of the storage bin 12, the first bracing member 86 resides on a respective side of the hopper outlet in abutting contact with a respective side of the bin's slide gate track 37, while the second bracing member 88 resides on a neighbouring side of the hopper outlet 18 in abutment with a closed terminal end of the bin's slide gate track 37, i.e. an end of the slide gate track 37 opposite from that from which the slide gate 36 is pulled into the open position. This working position of the metering housing 26 is shown in FIG. 13.

Figure 9:
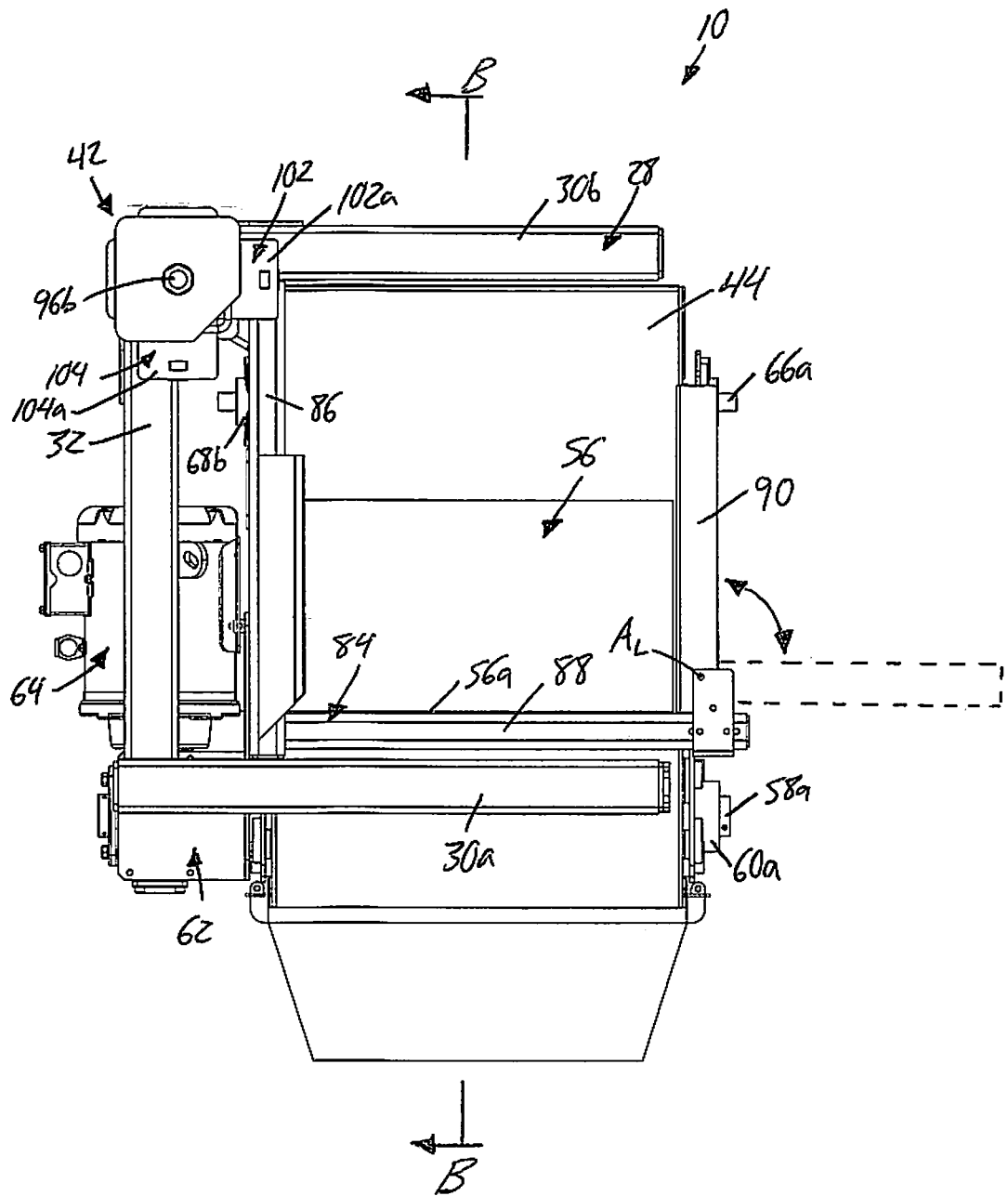
FIG. 9 is a top view of the metering device.

To further secure the metering housing 26 in the working position, a latching member 90 is pivotally coupled to the second bracing member 88 at a distal end thereof opposite the first bracing member 86 at or adjacent the plane of the opposing housing side wall 46a. The latching member 90 can swing relative to the second bracing member 88 about an upright latch axis $A_L$ defined by an upright pivot pin that penetrates the latching member and second bracing member 88 near the distal end thereof. With reference to FIG. 9, the latching member 90 can swing about this axis between the solid line latching position, in which the latching member 90 reaches perpendicularly from the second bracing member 88 in the longitudinal reference direction so as to lie parallel and opposite to the first bracing member 86 in abutted contact against a second opposing side of the slide gate track 37, and the broken-line release position, in which the latching member instead reaches laterally outward from the second bracing member in generally parallel relation thereto.

Figure 14:
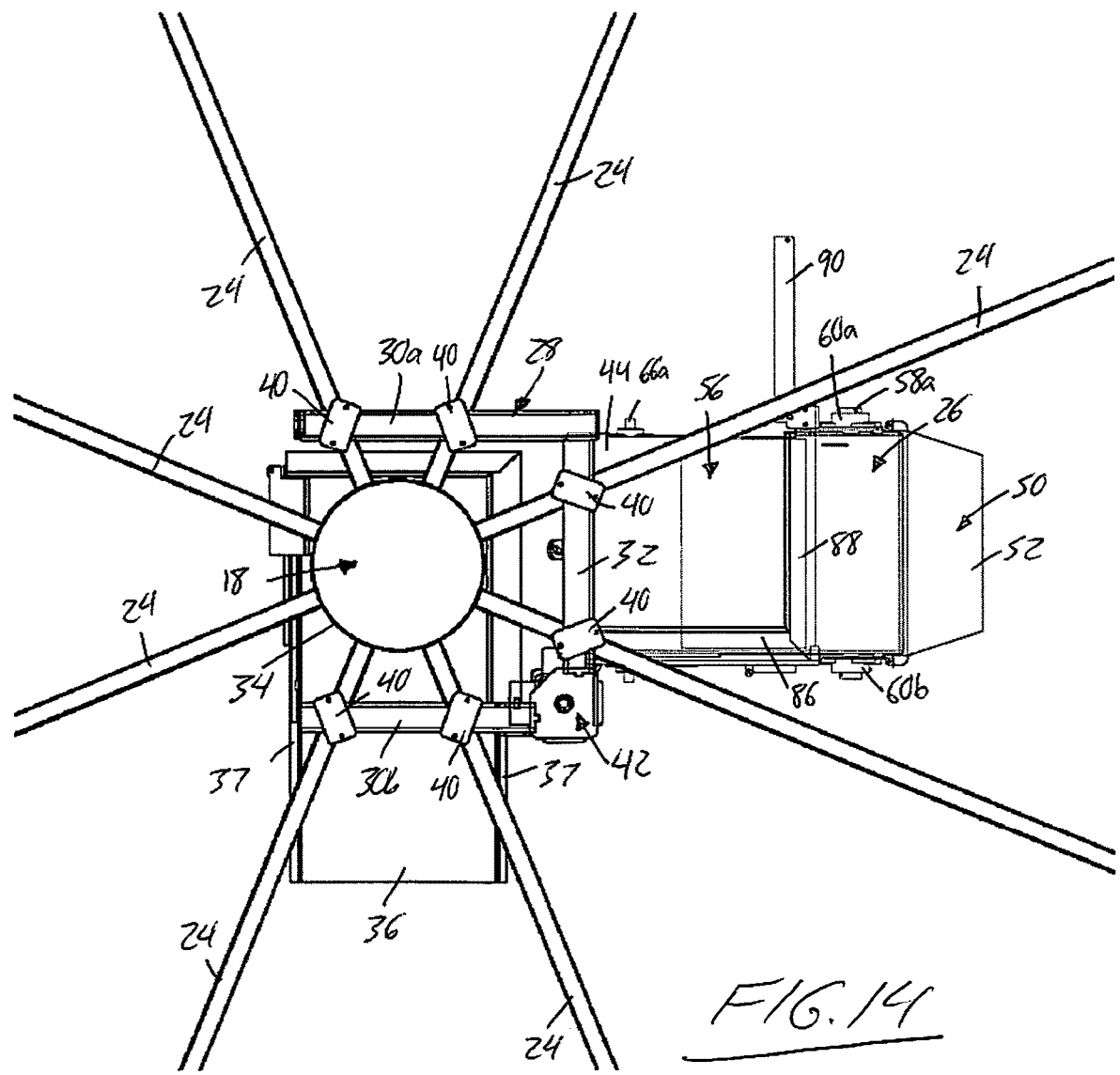
FIG. 14 is a plan view similar to FIG. 13, but with the metering housing swung out into a withdrawn position retracted from under the bottom hopper outlet of the storage bin.

A locking pin (not shown) can be mated through pin holes in the latching member and a cooperative lug (not shown) on the side wall 46a of the metering housing 26 to selectively lock the latching member in the latching position. In the locked in the latching position, the latching member 90 blocks swinging of the metering housing 26 out of the working position about an upright pivot axis of the pivot joint 42, as the first bracing member 86 and the opposing latching member 90 embrace opposing sides of the slide gate track 37 on opposite sides of the hopper outlet 18, thus blocking swinging of the metering housing relative to the hopper outlet 18. This locked state of the metering housing in the working position aligned under the hopper outlet 18 of the storage bin is shown in FIG. 13. Unlocking of the latching member 90 from the latching position, and swinging thereof into the release position allows the metering housing 26 to be swung about the pivot joint 42 into the withdrawn position of FIG. 14, where the metering housing is fully withdrawn out from under the hopper outlet 18, thus giving access to the topside of the metering housing for cleanout or inspection thereof via the inlet opening 56, and also giving access to the bin outlet 18, for example for cleaning or inspection thereof once the storage bin has been fully emptied.

Figure 11:
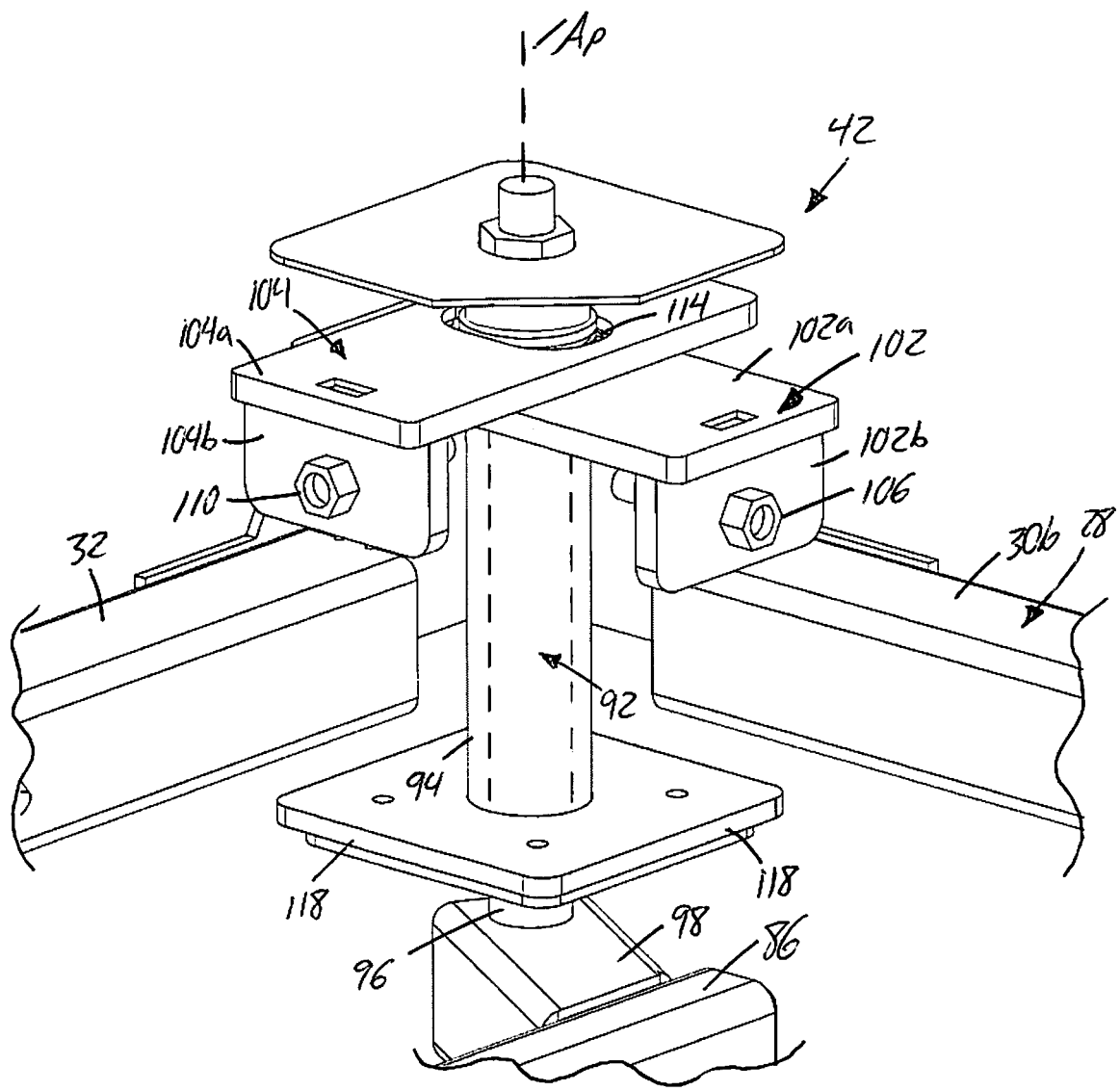
FIG. 11 is a partial closeup perspective view of the metering device, with select components of an adjustable pivot joint thereof hidden to reveal other internal components thereof.
Figure 12:
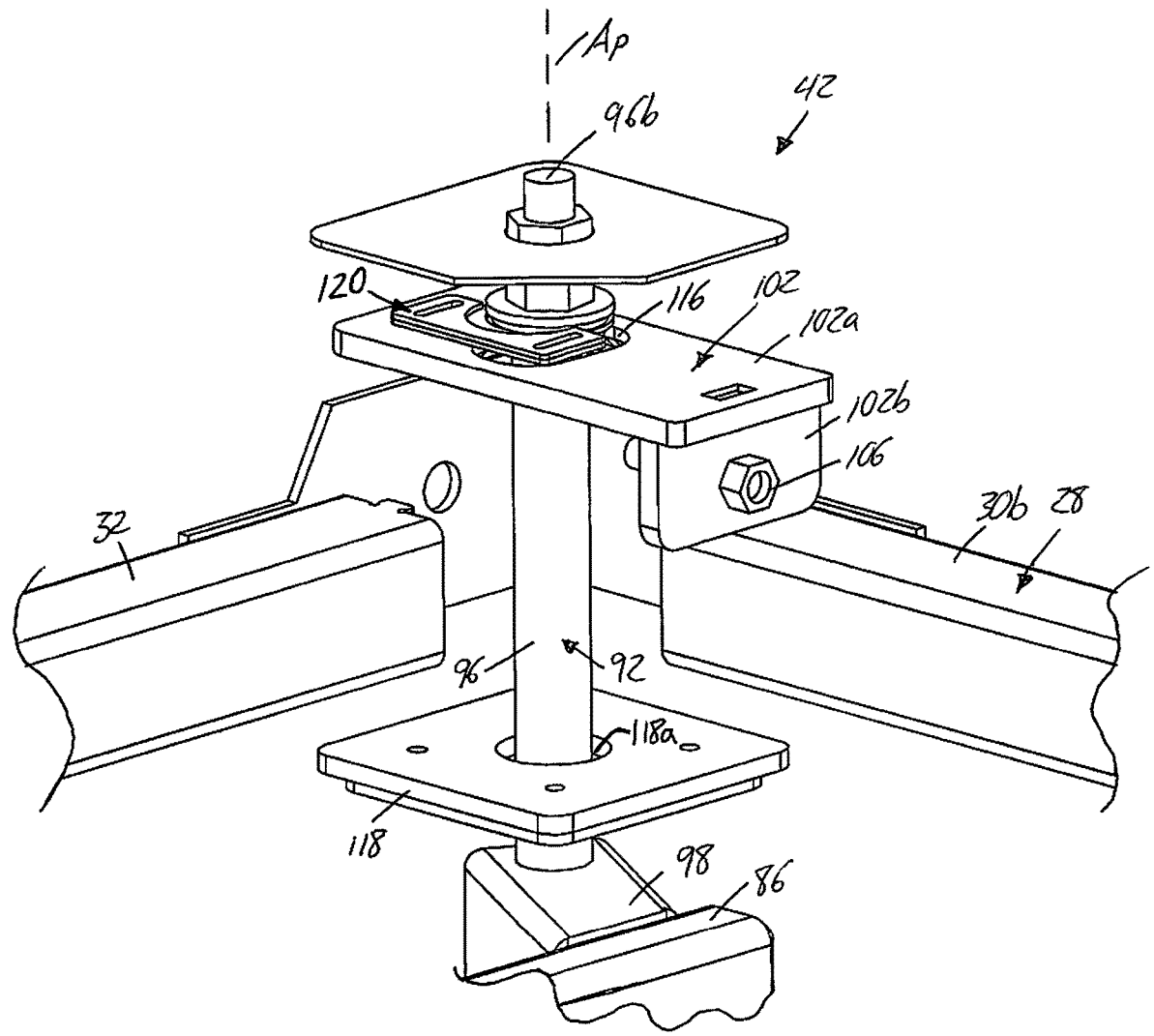
FIG. 12 is another partial closeup perspective view of the metering device of FIG. 3, with select components of the adjustable pivot joint thereof once again hidden to reveal other internal components thereof.

Referring to FIGS. 11 and 12, attention is now turned to the adjustable pivot joint 42, which features an upright multi-piece support shaft 92 composed an outer bushing or sleeve 94 and an inner shaft 96 extending axially therethrough. A lower end portion 96a of the inner shaft 96 situated outside the outer sleeve 94 beyond the lower end thereof is affixed to the metering housing, for example via penetrating and welded attachment to a stub-like support arm 98 that cantilevers a short distance outward from the first bracing member 86 atop the metering housing 26 at a rear corner thereof. In the illustrated example, the pivot joint 42 is particularly situated at the rear corner at the same side of the housing on which the drive components (motor 64 and gearbox 62) are carried, so that the radial distance to the drive components from the pivot axis of the pivot joint 42 is lesser than if the pivot joint and drive components were located at opposing sides of the housing 26. This way, the degree of strain placed on the pivot joint 42 by the weight of the drive components is minimized.

An upper end portion 96b of the inner shaft 96 is situated outside the outer sleeve 94 in upwardly spaced relation beyond the upper end of the outer sleeve. A tubular outer casing 100 of the pivot joint 42 (hidden in FIGS. 11 and 12 to reveal inner components of the joint, but visible in the other figures) closes around the support shaft 92 and has a square or rectangular cross-section so that four walls of this outer casing 100 face respectively outward from the upright support shaft 92 on all four sides thereof. On an inboard wall 100a of the casing 100 that faces laterally inward of the metering housing (i.e. toward the side of the metering housing opposite the pivot joint 42), outer leg 30b of the mounting frame 28 is affixed to the casing 100 and projects perpendicularly from the inboard wall 100a of the casing toward the opposing side of the housing 26. On a front wall 100b of the casing 100 that faces toward the front end of the metering housing 26, the cross-leg 32 of the mounting frame 28 is affixed to the casing 100 and projects perpendicularly from the front wall 100b of the casing toward the front end of the housing 26.

The inboard wall 100a of the casing features a slot-shaped opening therein that aligns with a matching slot-shaped opening of matching elevation in an opposing outboard wall 100c of the casing 100. Likewise, the front wall 100a of the casing 100 features a slot-shaped opening therein that aligns with a matching slot-shaped opening of matching elevation in an opposing rear wall 100d of the casing 100. A lateral adjustment bracket 102 has a sliding tab 102a thereof received in sliding relation through the aligned slot-shaped openings in the inboard and outboard walls 100a, 100c of the casing 100, and a longitudinal adjustment bracket 104 likewise has a sliding tab 104a thereof received in sliding relation through the aligned slot-shaped openings in the front and rear walls 100b, 100d of the casing 100. To enable this, the aligned openings in the front and rear walls of the casing are at different elevation from the aligned openings in the inside and outboard walls of the casing so that the slide tabs 102a, 102b don't interfere with one another inside the casing 100.

The lateral adjustment bracket 102 has a downturned flange 102b at a proximal the end of its sliding tab 102a situated to the inboard side of the pivot joint casing 100, and the longitudinal adjustment bracket 104 likewise has a downturned flange 104b at a proximal end of the sliding tab 104a situated to the front side of the pivot joint casing 100. A lateral adjustment bolt 106 is engaged through a pair of threaded bores respectively provided on the downturned flange 102b of the lateral adjustment bracket 102 and on the inboard wall 100a of the casing 100, for example as provided by a pair of threaded nuts 108a, 108b respectively affixed to the outboard sides of the bracket flange 102b and casing wall 100a. Likewise, a longitudinal adjustment bolt 110 is engaged through a pair of threaded bores respectively provided on the downturned flange 104b of the longitudinal adjustment bracket 104 and on the front wall 100b of the casing 100, for example as provided by another pair of threaded nuts 112a, 112b respectively affixed to the rear sides of the bracket flange 104b and casing wall 100b.

FIG. 11 shows the pivot joint 42 with the outer casing 100 removed to show the internal workings of the joint. Inside the outer casing 100, the sliding tab 104a of the longitudinal adjustment bracket 104 features an elongated slot 114 whose width is measured in the longitudinal reference direction and closely conforms to the outer diameter of the support shaft's outer sleeve 94, but whose length is measured in the lateral reference direction and notably exceeds the diameter of the support shaft's outer sleeve 94. In FIG. 12, in addition to the outer casing 100 of the pivot joint being removed, the longitudinal adjustment bracket 104 is also omitted in order to reveal a similar elongated slot 116 in the lateral adjustment bracket 102. This second slot 116 is of same relative dimension to the support shaft's outer sleeve as the first slot 114, but is oriented perpendicular to the first slot 114. Accordingly, the width of the second slot 116 is measured in the lateral reference direction and closely conforms to the outer diameter of the support shaft's outer sleeve 94, while its length is measured in the longitudinal reference direction and notably exceeds the diameter of the support shaft's outer sleeve 94. The elongated slot 116 in the lateral adjustment bracket 102 thus allows relative tilting between the lateral adjustment bracket 102 and the support shaft 92 in the longitudinal direction, but not in the lateral direction. To the contrary, the elongated slot 114 in the longitudinal adjustment bracket 104 allows relative tilting between the longitudinal adjustment bracket 104 and the support shaft 92 in the lateral direction, but not in the longitudinal direction.

The bottom end of the pivot joint's outer casing is capped off by a bottom cover 118 affixed thereto. As shown in FIG. 12, a central hole 118a in this bottom cover has a diameter exceeding the inner shaft 96 which passes through this hole in the bottom cover 118 to make the connection to the support arm 98 of the metering housing 26 at a distance below the casing 100 of the pivot joint 42. The outer sleeve 94 of the support shaft however doesn't penetrate the bottom cover 118 of the casing 100, and instead terminates inside above the bottom cover 118 within the interior space of the casing 100. The outer circumference of the inner shaft 96 and the inner circumference of the hollow outer sleeve 94 closely conform to one another maintain a substantially concentric relationship between these shaft components, thereby preventing relative tilting therebetween so that the entire support shaft 92 tilts as a singular unit, but at the same time, the inner shaft 96 is rotatable relative to the outer sleeve 94.

Since the inner shaft 92 is rigidly connected to the metering housing 26 via the support arm 98 and first bracing member 86, the metering housing 26 than thus be swung back and forth relative to the mounting frame 28 about the upright pivot axis $A_P$ defined by the inner shaft, due to the rotatability of the inner shaft about this axis relative to the surrounding outer sleeve 94. As discussed above, this enables swinging movement of the metering housing between a working position aligned under the storage bin hopper outlet 18, and a withdrawn position retracted out from under the storage bin hopper outlet 18 to enable access to both the metering housing inlet 56 and the hopper outlet for cleanout or inspection purposes between uses of the metering device. As shown in FIG. 12, a turn-stopper 120 may be provided to prevents rotation of the outer sleeve of the support shaft, thereby preventing rotational wear on the exterior thereof. Accordingly, all relative rotational movement occurs at the lubricated interface between the inner shaft and outer sleeve, and not at the non-lubricated outer surfaces of the sleeve.

Additionally, the adjustment brackets 102, 104 allow adjustment of the particular orientation of the upright pivot axis $A_P$ relative to the plane of the mounting frame, whereby the support shaft 92 can be titled to a limited degree relative to the plane of the mounting frame in order to properly set the metering housing 26 in a true horizontal orientation even if the mounting frame 28 is slightly out of horizontal due to a non-level condition of the storage bin's base structure 20.

Advancing the lateral adjustment bolt 106 on the lateral adjustment bracket 102 in a tightening direction through the threaded bores in which it is engaged will draw the downturned flange 102b of the lateral adjustment bracket in an outboard direction moving closer to the pivot joint casing 100, thus driving the slide tab 102a of the lateral adjustment bracket 102 further through the pivot joint casing 100 in this outboard direction, during which the slot 116 in the lateral adjustment bracket 102 pushes the upper portion of the support shaft's outer sleeve 94 in the outboard direction. This serves to laterally tilt the metering housing 26 relative to the mounting frame 28 in a manner lifting the side of the metering housing opposite the pivot joint 42. Reversing the lateral adjustment bolt 106 in a loosening direction causes the reverse lateral tilting effect, by retracting the downturned flange 102b of the lateral adjustment bracket 102 in the inboard direction moving away from the pivot joint casing 100, thus retracting the slide tab 102a further out of the pivot joint casing in this inboard direction, during which the slot 116 in the lateral adjustment bracket 102 pulls the upper portion of the support shaft's outer sleeve 94 in the inboard direction. This serves to laterally tilt the metering housing 26 relative to the mounting frame 28 in a manner lowering the side of the metering housing opposite the pivot joint 42.

The longitudinal adjustment bracket 104 and its respective adjustment bolt 110 is operable in the same manner to adjust the longitudinal tilt of the metering housing 26. Advancing the longitudinal adjustment bolt 110 on the longitudinal adjustment bracket 104 in a tightening direction through the threaded bores in which it is engaged will draw the down-turned flange 104a of the longitudinal adjustment bracket in a longitudinally rearward direction moving closer to the pivot joint casing 100, thus driving the slide tab 104a of the longitudinal adjustment bracket further through the pivot joint casing 100 in this rearward direction, during which the slot 114 in the longitudinal adjustment 104 bracket pushes the upper portion of the support shaft 92 rearwardly. This serves to longitudinally tilt the metering housing 26 relative to the mounting frame 28 in a manner lifting the front end of the metering housing 26. Reversing the longitudinal adjustment bolt 110 in a loosening direction causes the reverse longitudinal tilting effect, by retracting the down-turned flange 104a of the longitudinal adjustment bracket 104 in a longitudinally forward direction moving away from the pivot joint casing 100, thus retracting the slide tab 104a further out of the pivot joint casing in this forward direction, during which the slot 114 in the longitudinal adjustment bracket 104 pulls the upper portion of the support shaft 92 in the forward direction. This serves to longitudinally tilt the metering housing 26 relative to the mounting frame 28 in a manner lowering the front end of the metering housing 26.

The adjustment brackets and cooperating bolts thus provide a tilt adjustment mechanism built into the pivot joint 42, by which a tilt or inclination angle of the metering housing 26 relative to the mounting frame 28 can be adjusted in two perpendicular directions to acquire a properly levelled housing orientation regardless of deviations in the levelness of a storage bin on which the metering device is installed. While the illustrated embodiment uses bolts as passive actuators that rely on use of external hand or power tools to tilt the metering housing, other embodiments may employ active actuators, for example electric linear actuators powered from the same electrical power source used to drive the motor 64 of metering mechanism.

The forgoing metering device can be easily installed and properly leveled on any hopper-bottomed storage bin with a spoked support base, whether as part of a new bin installation or as a retrofit to an existing storage bin. Since the metering device is a stand-alone unit that is neither incorporated into the bin structure itself, nor part of a larger transfer conveyor, grain cleaner, grain dryer, seed treater or other conveying or processing equipment, it can be readily used with any existing portable transfer conveyor. The meter housing outlet 78 is simply a downward facing discharge opening that is open to the surrounding ambient environment, and the suspended mounting of the device 10 places it in an elevated state with notable ground clearance and a lack of auxiliary supports that would interfere with placement of a transfer conveyor's inlet hopper under the outlet 78 of the device 10. Accordingly, the inlet hopper of any portable transfer conveyor can easily be wheeled into place under the meter housing outlet 78 to receive accurately metered granular material therefrom. However, it will be appreciated that the particular suitability of the preferred embodiment for use as a retrofit and/or removable metering device compatible with portable transfer conveyors does not prohibit use of the metering device in other contexts. Accordingly, the metering device may be more permanently or integrally incorporated into the bin structure, whether at the time of manufacture or as a later retrofit installation, and/or may be used with fixed-location conveyors rather than portable transfer conveyors, for example in the context of a larger processing plant environment.

Use of an electric motor and accompanying VFD controller may be preferable over other possible drive options, in order to give the operator precise control over the motor operation. Together with the volumetric metering function of the cleated belt, this allows an operator to program precise loading operations into the controller based on the known volume capacity of the targeted destination for the granular material being unloaded from the storage bin. That is, the controller can be pre-programmed with data on the volumetric capacity of the cleated belt, i.e. the volume of total available inter-cleat space on the belt, which together with a selected belt revolution speed, can be used to automatically calculate how long the belt should be driven by the motor to deliver a targeted volumetric quantity of granular material to the outlet 78 of the metering device. So via a user interface of a VFD control panel, which may feature an alphanumeric keyboard, numeric keypad, touch-screen, dedicated push buttons, selection dials, or combinations thereof, a user can enter in a desired volumetric measure of material to be unloaded (e.g. based on the known volumetric capacity of the target destination), and optionally adjust an operating speed of the motor according to a delicacy, flowability or other characteristic of the granular material concerned, and the controller will automatically operate the cleated belt for the appropriately calculated amount of time to dispense that specifically targeted volume of material from the storage bin.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A metering device for metered dispensing of granular material from a hopper bottom storage bin, said metering device comprising:
   a metering housing;
   a housing inlet opening downwardly into the housing for receiving said granular material from a hopper outlet of the hopper bottom storage bin;
   a housing outlet from which the granular material is dispensable from the housing; and
   a metering mechanism operable within the housing between the housing inlet and the housing outlet to receive the granular material from the housing inlet and dispense said granular material through the housing outlet in a metered fashion;
   a motor mounted to the meter housing and operably coupled to the metering mechanism for selective driven operation thereof; and
   a mounting arrangement from which the metering housing is suspended, said mounting arrangement being configured for attachment to the hopper bottom storage bin in a position suspending the metering housing below the hopper outlet;
   wherein the mounting arrangement comprises a mounting frame to which the metering housing is movably coupled for selective movement relative to the mounting frame between a working position aligned under the hopper outlet, and a withdrawn position retracted away from the hopper outlet to reveal access thereto.

2. The metering device of claim 1 wherein said housing outlet is open to a surrounding ambient environment through which the housing outlet is communicable with an inlet hopper of a separate conveyor for receiving the metered granular material from the metering device.

3. The metering device of claim 1 wherein the metering housing is pivotally coupled to the mounting frame for swinging movement of the metering housing between the working and retracted positions about a pivot axis.

4. The metering device of claim 3 comprising a pivotal joint connected between the mounting frame and said housing and defining said pivot axis, wherein said pivotal joint is adjustable to change an angle of said pivot axis in at least one direction.

5. The metering device of claim 4 wherein said pivotal joint is adjustable to change said angle of said pivot axis in multiple directions.

6. The metering device of claim 1 comprising a tilt adjustment mechanism connected between the housing and the mounting arrangement and operable to adjust a tilt angle of the housing in at least one direction.

7. The metering device of claim 1 wherein the mounting arrangement comprises an open-ended frame configured to span circumferentially around the hopper outlet on multiple, but less than all, sides thereof.

8. The metering device of claim 1 wherein the mounting arrangement is a U-shaped frame having two outer legs for placement on two opposing sides of the hopper outlet, and a cross-leg joining said two outer legs for residing on a third side of the hopper outlet.

9. The metering device of claim 1 comprising an alignment and latching mechanism on the housing for releasably aligning and securing the metering housing in stationary relation to the hopper outlet.

10. The metering device of claim 9 wherein said alignment and latching mechanism comprises a pair of static bracing members arranged to embrace two neighbouring sides of the hopper outlet, and a movable latch movable into a closed latching position lying opposite one of said two bracing members.

11. The metering device of claim 1 in combination with said hopper-bottomed storage bin, wherein a base of said hopper-bottomed storage bin comprises a plurality of upright support legs and a plurality of spokes emanating outwardly from said hopper outlet to connect to said support legs, the mounting frame is seated atop said spokes, and the metering housing is suspended below said spokes.

12. The metering device of claim 1 comprising mounting clamps for attaching said mounting frame to an existing hopper-bottomed storage bin.

13. The metering device of claim 1 wherein the metering mechanism comprises a belted metering mechanism comprising a set of rollers, an endless belt entrained about said set of rollers to follow a revolutionary path therearound, and a set of cleats attached to said belt at regularly spaced intervals, the rollers and the belt being oriented to convey the cleats in underpassing relation to the housing inlet of the metering housing, and onward toward the housing outlet of the metering housing, during an upper span of said revolutionary path.

14. The metering device of claim 13 wherein an upper wall of the metering housing, at an area thereof residing between the housing inlet and the housing outlet, comprises an internal liner that is of distinct material composition from the upper wall of the metering housing and is positioned for sliding contact thereof by the cleats as said cleats move past the housing inlet toward the housing outlet during said an upper span of said revolutionary path.

15. A metering device for metered dispensing of granular material from a hopper bottom storage bin, said metering device comprising:
a metering housing;
a housing inlet opening downwardly into the housing for receiving said granular material from a hopper outlet of the hopper bottom storage bin;
a housing outlet from which the granular material is dispensable from the housing; and
a metering mechanism operable within the housing between the housing inlet and the housing outlet to receive the granular material from the housing inlet and dispense said granular material through the housing outlet in a metered fashion;
a motor mounted to the meter housing and operably coupled to the metering mechanism for selective driven operation thereof;
a mounting arrangement from which the metering housing is suspended, said mounting arrangement being configured for attachment to the hopper bottom storage bin in a position suspending the metering housing below the hopper outlet; and
a tilt adjustment mechanism connected between the housing and the mounting arrangement and operable to adjust a tilt angle of the housing in at least one direction, said tilt adjustment mechanism comprising:
a support shaft that suspends said metering housing from the mounting arrangement and passes through one more elongated slots whose lengths exceed an outer diameter of said shaft; and
one or more adjustment actuators each displaceable in a length direction of a respective one of the elongated slots to move a portion of said shaft in said length direction and thereby adjust a tilt angle at which said shaft penetrates said respective one of the elongated slots, thereby adjusting said inclination angle of the housing in a respective direction.

16. The metering device of claim 15 wherein each adjustment actuator is coupled to a respective adjustment bracket having an opening therein that is also penetrated by the support shaft, said opening closely conforming to the outer diameter of the support shaft in the length direction of the respective slot in which the shaft is movable by said adjustment actuator.

17. The metering device of claim 16 wherein said one or more elongated slots comprises a pair of elongated slots, said one or more adjustment actuators comprises a pair of adjustment actuators coupled to a pair of adjustment brackets, and the closely conforming opening in each adjustment bracket is the elongated slot in which the shaft is adjustable by the adjustment actuator on the other adjustment bracket.

18. The metering device of claim 15 wherein the support shaft comprises an outer sleeve, and an inner shaft that is rotatable relative to the outer sleeve to enable pivotal movement of the metering housing relative to the mounting frame about an axis of said inner shaft.

19. The metering device of claim 15 wherein the mounting arrangement comprises an open-ended frame configured to span circumferentially around the hopper outlet on multiple, but less than all, sides thereof.

20. The metering device of claim 15 wherein the mounting arrangement is a U-shaped frame having two outer legs for placement on two opposing sides of the hopper outlet, and a cross-leg joining said two outer legs for residing on a third side of the hopper outlet.

21. The metering device of claim 15 comprising an alignment and latching mechanism on the housing for releasably aligning and securing the metering housing in stationary relation to the hopper outlet, wherein said alignment and latching mechanism comprises a pair of static bracing members arranged to embrace two neighbouring sides of the hopper outlet, and a movable latch movable into a closed latching position lying opposite one of said two bracing members.

22. The metering device of claim 15 in combination with said hopper-bottomed storage bin, wherein a base of said hopper-bottomed storage bin comprises a plurality of upright support legs and a plurality of spokes emanating outwardly from said hopper outlet to connect to said support legs, the mounting frame is seated atop said spokes, and the metering housing is suspended below said spokes.

* * * * *